(12) United States Patent
Michel et al.

(10) Patent No.: US 9,294,233 B2
(45) Date of Patent: Mar. 22, 2016

(54) DECODING METHOD

(71) Applicant: CELLULAR COMMUNICATIONS EQUIPMENT LLC, Plano, TX (US)

(72) Inventors: Juergen Michel, Munich (DE); Bernhard Raaf, Neuried (DE)

(73) Assignee: Cellular Communications Equipment LLC, Plano, TX (US)

( * ) Notice: Subject to any disclaimer, the term of this patent is extended or adjusted under 35 U.S.C. 154(b) by 0 days.

(21) Appl. No.: 14/690,298

(22) Filed: Apr. 17, 2015

(65) Prior Publication Data

US 2015/0229445 A1 Aug. 13, 2015

Related U.S. Application Data

(63) Continuation of application No. 14/140,833, filed on Dec. 26, 2013, which is a continuation of application No. 11/661,006, filed as application No. PCT/EP2005/054578 on Sep. 15, 2005, now Pat. No. 8,645,786.

(30) Foreign Application Priority Data

Sep. 15, 2004 (EP) ...................................... 04021970
Nov. 15, 2004 (EP) ...................................... 04027144

(51) Int. Cl.
*H04L 1/18* (2006.01)
*H04L 1/16* (2006.01)
(Continued)

(52) U.S. Cl.
CPC ............ *H04L 1/1819* (2013.01); *H04L 1/0041* (2013.01); *H04L 1/0045* (2013.01);
(Continued)

(58) Field of Classification Search
CPC .................................. H04L 1/1819; H04L 1/16
USPC ..................................................... 714/751, 790
See application file for complete search history.

(56) References Cited

U.S. PATENT DOCUMENTS 3,870,824 A 3/1975 Baichtal et al.
5,483,545 A 1/1996 Darmon et al.
(Continued)

FOREIGN PATENT DOCUMENTS

AU 2004214394 2/2004
DE 103 44 765 A1 4/2005
(Continued)

OTHER PUBLICATIONS

Ancheta, "Convolutional Parity Check Automatic Repeat Request," IBM Technical Disclosure Bulletin, vol. 22, No. 9, TDB-ACC-No. NN80024287, pp. 4287-4290, Feb. 1, 1980.
(Continued)

*Primary Examiner* — Joseph D Torres
(74) *Attorney, Agent, or Firm* — Martin & Ferraro, LLP (57) ABSTRACT

A decoding method for decoding information content in at least one data packet, which is transmitted from a sender to a receiver via a data link. The information is represented by a bit sequence, which is transformed into a transmittable redundancy version. The information is initially transmitted for a first time in a first data packet from the sender to the receiver. The information is represented by a first redundancy version, which is self-decodable. An incorrect receipt is confirmed by sending a confirmation from the receiver to the sender. The information is retransmitted at least a second time in a second data packet from the sender to the receiver upon receipt of the confirmation, wherein, for representation of the information, a second redundancy version is used, the selection of which is performed in dependence on a coding parameter, describing whether the redundancy version is self-decodable or not.

18 Claims, 1 Drawing Sheet

(51) Int. Cl.
*H04L 1/00* (2006.01)
*H04L 1/08* (2006.01)

(52) U.S. Cl.
CPC ............... *H04L1/0068* (2013.01); *H04L 1/08* (2013.01); *H04L 1/16* (2013.01); *H04L 1/1816* (2013.01); *H04L 1/1845* (2013.01); *H04L 1/1896* (2013.01); *H04L 1/0066* (2013.01); *H04L 1/0072* (2013.01)

(56) References Cited

U.S. PATENT DOCUMENTS

| | | | |
|---|---|---|---|
| 5,657,325 A * | 8/1997 | Lou et al. | 370/334 |
| 6,208,663 B1 | 3/2001 | Schramm et al. | |
| 6,308,294 B1 * | 10/2001 | Ghosh et al. | 714/751 |
| 6,317,418 B1 | 11/2001 | Raitola et al. | |
| 6,631,127 B1 * | 10/2003 | Ahmed et al. | 370/349 |
| 6,658,005 B2 | 12/2003 | Seidel et al. | |
| 6,697,987 B2 | 2/2004 | Lee et al. | |
| 6,700,867 B2 * | 3/2004 | Classon et al. | 370/216 |
| 6,704,898 B1 | 3/2004 | Furuskar et al. | |
| 6,798,846 B2 | 9/2004 | Golitschek Edler Von Elbwart et al. | |
| 6,996,114 B2 * | 2/2006 | Sebire | 370/403 |
| 7,000,173 B2 * | 2/2006 | Buckley et al. | 714/790 |
| 7,072,307 B2 * | 7/2006 | Tong et al. | 370/253 |
| 7,110,470 B2 | 9/2006 | Von Elbwart et al. | |
| 7,155,655 B2 | 12/2006 | Cheng | |
| 7,210,089 B2 | 4/2007 | Xu et al. | |
| 7,237,170 B2 * | 6/2007 | Ratasuk et al. | 714/748 |
| 7,260,770 B2 | 8/2007 | Stewart et al. | |
| 7,263,088 B2 * | 8/2007 | Bui | 370/338 |
| 7,269,420 B2 | 9/2007 | Heo et al. | |
| 7,301,929 B2 * | 11/2007 | Frederiksen et al. | 370/342 |
| 7,366,477 B2 | 4/2008 | Sebire et al. | |
| 7,372,837 B2 * | 5/2008 | Kinjo et al. | 370/338 |
| 7,385,954 B2 * | 6/2008 | Gopalakrishnan et al. | 370/335 |
| 7,477,628 B2 * | 1/2009 | Hagiwara et al. | 370/335 |
| 7,640,486 B2 * | 12/2009 | Dottling et al. | 714/790 |
| 7,676,731 B2 * | 3/2010 | Moon et al. | 714/774 |
| 7,676,732 B2 * | 3/2010 | Moon et al. | 714/774 |
| 7,680,076 B2 | 3/2010 | Michel et al. | |
| 7,808,955 B2 | 10/2010 | Dottling et al. | |
| 7,925,953 B2 | 4/2011 | Malkamaki et al. | |
| 8,645,786 B2 | 2/2014 | Michel et al. | |
| 8,935,588 B2 | 1/2015 | Michel et al. | |
| 2002/0053058 A1 | 5/2002 | Lee et al. | |
| 2002/0093937 A1 | 7/2002 | Kim et al. | |
| 2002/0129312 A1 | 9/2002 | Sipola | |
| 2002/0159431 A1 * | 10/2002 | Moulsley et al. | 370/347 |
| 2003/0110435 A1 | 6/2003 | Wu et al. | |
| 2003/0118031 A1 | 6/2003 | Classon et al. | |
| 2003/0133497 A1 | 7/2003 | Kinjo et al. | |
| 2003/0153276 A1 | 8/2003 | Terry et al. | |
| 2004/0039979 A1 | 2/2004 | Garani | |
| 2004/0160925 A1 | 8/2004 | Heo et al. | |
| 2004/0223507 A1 | 11/2004 | Kuchibhotla et al. | |
| 2005/0076284 A1 | 4/2005 | Dottling et al. | |
| 2005/0100085 A1 * | 5/2005 | Dottling et al. | 375/240 |
| 2005/0213536 A1 | 9/2005 | Virtanen et al. | |
| 2006/0146889 A1 | 7/2006 | Malkamaki et al. | |
| 2006/0251079 A1 | 11/2006 | Kwak et al. | |
| 2014/0115415 A1 | 4/2014 | Michel et al. | |

FOREIGN PATENT DOCUMENTS

| | | |
|---|---|---|
| EP | 1 195 938 A1 | 4/2002 |
| EP | 1 313 250 A1 | 5/2003 |
| EP | 1 156 617 B1 | 9/2003 |
| EP | 1 357 695 A2 | 10/2003 |
| EP | 1 286 491 A1 | 6/2004 |
| EP | 2 197 141 A2 | 6/2010 |
| WO | WO 01/22747 | 3/2001 |
| WO | WO 03/055124 | 7/2003 |
| WO | WO 2005/036908 | 4/2005 |

OTHER PUBLICATIONS

Berrou et al., "Near Shannon Limit Error-Correcting Coding and Decoding: Turbo-Codes (1)," Proceeding of ICC '93, Geneva, IEEE 0-7803-0950-2, pp. 1064-1070, May 23, 1993, 7 pgs.

Bertinelli et al., "HARQ for WCDMA Enhanced Uplink: Link Level Performance in SHO," Personal, Indoor and Mobile Radio Communications (PIMRC) 2004, 15th IEEE International Symposium on (vol. 4), pp. 2856-2860, Sep. 5, 2004, 6 pgs.

Caire et al., "The throughput of Hybrid-ARQ Protocols for the Gaussian Collision Channel," pp. 1-45, Jan. 22, 2001, 45 pgs.

Cheng, "On the Coding Gain of Incremental Redundancy Over Chase Combining", IEEE Global Telecommunications Conference, IEEE 0-7803-7974, pp. 107-112, Dec. 1, 2003, 6 pgs.

Das et al., "Adaptive, Asynchronous Incremental Redundancy (A2IR) with Fixed Transmission Time Intervals (TTI) for HSDPA," Personal, Indoor and Mobile Radio Communications (PIMRC) 2002, The 13th IEEE International Symposium on (vol. 3), Sep. 15, 2002, 5 pgs.

Dottling et al., "Hybrid ARQ and Adaptive Modulation and Coding Schemes for High Speed Downlink Packet Access," Personal, Indoor and Mobile Radio Communications (PIMRC) 2002, The 13th IEEE International Symposium on (vol. 3), Sep. 15, 2002, 5 pgs.

Ericsson, "E-DCH HARQ protocol," 3GPP TSG-RAN WG2 meeting #43, Tdoc R2-041617, Aug. 16, 2004, 4 pgs.

Ericsson, "E-DCH Physical LayerHybrid ARQ Processing," TSG-RAN WG1 #38, R1-040958, Aug. 16, 2004, 3 pgs.

Frenger et al., "Performance Comparison of HARQ with Chase Combining and Incremental Redundancy for HSDPA," Vehicular Technology Conference (VTC) 2001, IEEE VTS 54th (vol. 3), pp. 1829-1833, Oct. 7, 2001, 5 pgs.

Ghosh et al., "Overview of Enhanced Uplink for 3GPP W-CDMA," Vehicular Technology Conference, 2004, VTC 2004-Spring, 2004 IEEE 59th (vol. 4), pp. 2261-2265, May 2004, 5 pgs.

Kolding et al., "Performance Aspects of WCDMA Systems with High Speed Downlink Packet Access (HSDPA)," Vehicular Technology Conference (VTC) 2002, Proceedings, VTC 2002—Fall, 2002 IEEE 56th (vol. 1), Sep. 24, 2002, pp. 477-481, 5 pgs.

Mukhtar et al., "Packet Latency for Type-II Hybrid ARQ Transmission over a Correlated Error Channel," in In Proc. European Wireless 2002, Next Generation Wireless Networks: Technologies, Protocols, Services and Applications, Jan. 2002, 7 pgs.

Nokia, "Implicit Redundancy Version for IR HARQ Scheme," 3GPP TSG-RAN WG1 Rel-6 Ad Hoc, R1-040752, Jun. 21, 2004, 3 pgs.

Nokia, "Implicit Redundancy Version for IR HARQ Scheme," 3GPP TSG_RAN WG1 Meeting #38bis, R1-041149 (R1-040752, 0973), Sep. 20, 2004, 4 pgs.

Panasonic, "Downlink signalling related issues for Enhanced Uplink," 3GPP TSG-RAN WG1#39 meeting, R1-041339, Nov. 15, 2004, 2 pgs.

Panasonic, "Proposal of bit mapping for type-III HARQ," TSG-RAN Working Group 1 Meeting #18, TSGR1#18(01)0031, Jan. 15, 2001, 7 pgs.

Qualcomm Europe, "Link Performance with different RV for High Data Rates," 3GP TSG-RAN WG1 #37-bis, R1-040720, Jun. 21, 2004, 9 pgs.

Qualcomm Europe, "Link Performance with different RV for Data Rates," 3GPP TSG-RAN WG1 #37-bis, R1-040719, Jun. 21, 2004, 9 pgs.

Samsung, "RV Signalling," TSG RAN WG1 Meeting #38, R1-040862, Aug. 16, 2004, 5 pgs.

Siemens, "Feasibility of IR schemes or Enhanced Uplink DCH in SHO," 3GPP TSG RAN WG1 Meeting #36, Tdoc R1-040207, Feb. 16, 2004, 3 pgs.

Soljanin et al., "Hybrid ARQ with Random Transmission Assignments," DIMACS Series in Discrete Mathematics and Theoretical Computer Science, vol. 66, Mar. 2004, 15 pgs.

Civil Action No. 6:14-cv-759-JRG, *Cellular Communications Equipment LLC v. Samsung Electronics Co., LTD., et al.*, Defen- (56) References Cited

OTHER PUBLICATIONS dants' Joint Invalidity Contentions and Production of Documents pursuant to Patent Rules 3-3 and 3-4(B), E.D. Tex., Jul. 10, 2015, 735 pgs.
Civil Action No. 6:14-cv-759-JRG, *Cellular Communications Equipment LLC v. Samsung Electronics Co., LTD., et al.*, Joint Claim Construction and Pre-Hearing Statement, with Exhibits, E.D. Tex., Sep. 11, 2015. 41 pgs.
Civil Action No. 6:14-cv-759-JRG, *Cellular Communications Equipment LLC v. Samsung Electronics Co., LTD., et al.*, Defendants' Letter Brief—Motion for Summary Judgment of Invalidity based on Indefiniteness, E.D, Tex., Sep. 22, 2015, 7 pgs.
3GPP, "3rd Generation Partnership Project; Technical Specification Group Radio Access Network; FDD Enhanced Uplink; Physical Layer Aspects (Release 6)," 3GPP TR 25.808 V0.2.3, Oct. 2004, 20 pgs.
3GPP "3rd Generation Partnership Project; Technical Specification Group Radio Access Network; High Speed Downlink Packet Access: Physical Layer Aspects (Release 5)," 3GPP TR 25.858 V5.0.0, Mar. 2002, 31 pgs.
3GPP, "3rd Generation Partnership Project; Technical Specification Group Radio Access Network; Feasibility Study for Enhanced Uplink for UTRA FDD (Release 6)," 3GPP TR 25.896 V2.0.0, R1-040392, Mar. 2004, 180 pgs.
3GPP, "3rd Generation Partnership Project; Technical Specification Group Radio Access Network; Multiplexing and channel coding (FDD) (Release 5)," 3GPP TS 25.212 V5.0,0, Mar. 2002, 74 pgs.
3GPP, "3rd Generation Partnership Project; Technical Specification Group Radio Access Network; Multiplexing and channel coding (FDD) (Release 6)," 3GPP TS 25.212 V6.5.0, Jun. 2005, 81 pgs.
3GPP, "3rd Generation Partnership Project; Technical Specification Group Radio Access Network; FDD Enhanced Uplink; Overall description; Stage 2 (Release 6)," 3GPP TS 25.309 V6.3.0 Jun. 2005, 33 pgs.
Ericsson, "E-DCH Physical Layer Hybrid ARQ Processing," TSG-RAN WG1 #38, R1-040958, Aug. 16, 2004, 3 pgs.
Ericsson, "E-DCH Physical Layer Hybrid ARQ Processing," TSG-RAN WG1 #38bis, R1-041179, Sep. 20-24, 2004, 3 pgs.
Ghosh et al., "Incremental Redundancy (IR) Schemes for W-CDMA HS-DSCH," IEEE PIMRC 2002, pp. 1078-1082, 0-7803-7589-0, Sep. 15-18, 2002, 5 pgs.
Jung et al., "Determining the Optimum Threshold Values of MCS Levels for Retransmission Packets in HARQ Schemes," IEEE Vehicular Technology Conference, pp. 1935-1939, Apr. 22-25, 2003, 5 pgs.
LGIC and Samsung Electronics Co., "Simulation Results of Puncturing Algorithms for Turbo Code," TSG-RAN Working Group 1(Radio) meeting #7, TSGR1#7(99) b89, Aug. 30-Sep. 3, 1999, 9 pgs.
Motorola, "Revised: Hybrid-ARQ Scheme Using Incremental Redundancy," TSG-Ran 1#22, TSGR1-01-1244, Nov. 19-23, 2001, 13 pgs.
Motorola, "Synchronous HARQ and reliable signalling during SHO (Enhanced Uplink)," 3GPP TSG-RAN WG1+2, R1-040906, Aug. 16, 2004, 3 pgs.
Nortel Networks, "Optimum Rate Matching of Turbo/Convolutional Coding for 3GPP Up/Down Links," TSG-RAN WG-1, Meeting #6, Espoo, Finland, TSG-R1#6(99)967, Jul. 13-16, 1999, 7 pgs.
Siemens, "CR 25.212—Introduction of E-DCH," TSG-RAN WG1 #39, R1-041354, Nov. 15, 2004, 87 pgs.
Siemens AG, "ARQ error control techniques," TSG-RAN Working Group 2 (Radio layer 2 and Radio layer 3), TSGR2#2(99)085 (R2-99085), Mar. 8-11, 1999, 5 pgs.
Qualcomm Europe "Choice RV and Code Rates for E-DCH," 3GPP TSG-RAN WG1 #38 , R1-040891 , Aug. 16-20, 2004, 8 pgs.
Civil Action No, 6:14-cv-759, *Cellular Communications Equipment LLC v. Samsung Electronics Co., Ltd., et al.*, Plaintiffs (CCE) Responsive Letter Brief, E.D. Tex., Oct. 9, 2015, 6 pgs.
Civil Action No. 6:14-cv-759, *Cellular Communications Equipment LLC v. Samsung Electronics Co., Ltd., et al.*, Defendants' Reply Letter Brief, E.D. Tex., Oct. 19, 2015, 5 pgs.
Civil Action No. 6:14-cv-759-JRG, *Cellular Communications Equipment LLC v. Samsung Electronics Co., Ltd., et al.*, Plaintiffs Opening Brief on Claim Construction, E.D. Tex., Oct. 23, 2015, 26 pgs.
Civil Action No. 6:14-cv-759-JRG, *Cellular Communications Equipment LLC v. Samsung Electronics Co., Ltd., et al.*, Defendants' Responsive Claim Construction Brief, with relevant Exhibit, E.D. Tex., Nov. 6, 2015, 78 pgs.
Civil Action No. 6:14-cv-759-JRG, *Cellular Communications Equipment LLC v.Samsung Electronics Co., Ltd., et al.*, Declaration of J. Stevenson Kenney, Ph.D. Regarding Claim Construction, E.D, Tex., Nov. , 2015, 33 pgs.
Civil Action No, 6:14-cv-759, *Cellular Communications Equipment LLC v. Samsung Electronics Co., Ltd., et al.*, Plaintiffs (CCE) Reply Brief on Claim Construction, with relevant Exhibit, E.D. Tex,, Nov. 13, 2015, 52 pgs.
Civil Action No. 6:14-cv-759, *Cellular Communications Equipment LLC v. Samsung Electronics Co., Ltd., et al.*, Declaration of Claude Royer, E.D. Tex., Nov. 13, 2015, 31 pgs.
Civil Action No. 6:14-cv-759, *Cellular Communications Equipment LLC v. Samsung Electronics Co., Ltd., et al.*, Defendants' Sur-Reply Brief on Claim Construction, with Exhibits, E.D. Tex., Nov. 20, 2015, 47 pgs.

\* cited by examiner

DECODING METHOD

CROSS-REFERENCE TO RELATED APPLICATION

This application is a Continuation of U.S. patent application Ser. No. 14/140,833 filed Dec. 26, 2013 (Publication No. 2014/0115415); which is a Continuation of U.S. patent application Ser. No. 11/661,006 filed Feb. 23, 2007 and issued Feb. 4, 2014 as U.S. Pat. No. 8,645,786; which is a National Stage Entry, under 35 U.S.C. §371, of Application No. PCT/EP2005/054578 filed Sep. 15, 2005, designating the United States; the application also claims priority, under 35 U.S.C. §119, of European Patent Application Nos. EP 04021970.1 filed Sep. 15, 2004 and EP 04027144.7 filed Nov. 15, 2004; the disclosures of which are incorporated herein by reference.

BACKGROUND OF THE INVENTION

Field of the Invention

The invention concerns a decoding method and a telecommunication device for performing that method.

Often for a better decoding result several transmissions of the same data packet are combined. Combining data packets is already known for communication systems where packet transmission is employed. One example of such a transmission system is the so called E-DCH scheme (E-DCH: Enhanced Dedicated Channel, basically an improvement of the existing UMTS uplink channel) which is right now being standardized as an enhancement of the UMTS system (UMTS: Universal Mobile Telecommunication System).

The outlines of the E-DCH scheme can be found in the 3GPP RAN 1 technical report TR 25.896 v2.0.0 "Feasibility Study for Enhanced Uplink for UTRA FDD (Release 6)", R1-040392, February 2004, Malaga, Spain.

This scheme is designed to make use of a HARQ (HARQ: Hybrid ARQ, Hybrid Automatic Repeat reQuest) scheme. In this scheme packets are transmitted, and if they are not received correctly, a retransmission is transmitted upon receipt of a negative confirmation of the receiver, a so called "not acknowledge" (NACK). If the receipt has been correct a positive confirmation is sent, the so called "acknowledge" (ACK). In the case of more than one transmission of the same data packet, at the receiver both the initial transmission and the retransmission is used for decoding the packet. Therein "soft bit decisions" making use of the information of both data packets is used. This means that to every bit of the data packet of transmission or retransmission a quantity is assigned which is correlated with the probability, whether the bit is 1 or 0. The decoding is then done considering both quantities.

This gives a better performance, as if only the retransmission would be used without regarding previous transmissions (hybrid ARQ with selection combining).

In order to a proper function of this scheme as explained above, it should be ensured, that both received transmissions actually relate to the same transmitted (higher layer) packet i.e. both transmissions are derived from the same information content, the same "higher layer" packet (but may be transmitted using different packets on layer 1). Layer refers here to the OSI (Open System Interconnection) model. Due to transmission properties, which are considered in layer 1, the representation of information for a certain application, the application itself being taken care of in a higher layer) may be different for transmission and retransmission.

There are several ways to ensure this: one is a so called synchronous retransmission protocol. In this protocol a retransmission is sent at a fixed time interval after the initial transmission or also the previous retransmission, if more than one retransmission is foreseen. In this way the receiver knows at which times it can expect retransmissions of a given packet.

However, the receiver still does not know, whether two transmissions at compatible times actually relate to the same packet, or whether already the transmission of a new packet has been started. This is in particular the case if the receiver is not able to receive all packets but misses some, e.g. due to interference. If the transmission employs soft handover (SHO), that means that more than one receiver tries to receive the packets, it may well be that one receiver has not been able to receive a packet, but another receiver has been able to do so and acknowledged the packet. In this case a new packet can be transmitted next. The receiver which did not receive the first packet has no knowledge on the acknowledgement send by the other receiver and therefore must now somehow recognize that this new packet cannot be combined with any previously received packets.

In respect of the E-DCH a soft handover takes place, e.g. if a terminal, which has established a data connection with a first base station approaches a second base station. In a transition phase there is a connection to both base stations, in order to ensure a smooth or soft transition when going from one cell, governed by the first base station to the second cell, governed by the second base station.

For an easy recognition, it is further possible to introduce a so called Retransmission Sequence Number (RSN) or retransmission counter:

This counter is reset (e.g. to 0) if a new data packet is transmitted, and it is incremented with each retransmission. If the receiver compares the difference in RSN with the difference in time (taking into consideration the synchronous retransmission protocol and the known time difference between retransmission), the receiver can combine the receptions if the differences in time an RSN match and not combine them if the differences do not match.

It is a problem according to the state of the art, that the value range of the RSN is at least as large as the maximum number of possible retransmissions: Typically if a packet cannot be transmitted with a maximum number of retransmission this packet is dropped and the next packet is transmitted. The maximum number of possible retransmissions can be quite high. This can cause an excessive amount of signaling information, as the RSN has to be transmitted with every packet transmission and retransmission.

SUMMARY OF THE INVENTION

Based on this state of the art, it is therefore an object of the invention to provide a possibility of improving a transmission of data packets, wherein a retransmission of data packets is foreseen.

It is a further task of the presented invention to present an improved retransmission method.

This object is achieved by what is disclosed in the independent claims. Advantageous embodiments are subject of the dependent claims.

According to the invention a data packet is transmitted from a sender to a receiver. In the data packet information is contained, which is represented by bit sequence. For transmission this bit sequence is transformed into a redundancy version that is one out of more possible representations suited for transmission. In case the receiver does not receive the data packet correctly, it sends a confirmation, e.g. a NACK, to the sender. Upon this receipt the sender retransmits the information in a second data packet, which might be different from the first one. For this retransmission a second redundancy version is used, which might be different from the first one. The selection of the redundancy version for the second transmission is based on a coding parameter, which denotes whether the redundancy version is self-decodable, that means decodable only by itself or not.

This selection has the advantage that the selection of the redundancy version can be done taking into account the transmission properties, e.g. whether the receiver has previous versions of the data packets which it can use for decoding. Thus better decoding results can be achieved. At the same time no or only little additional effort is performed for additional signaling.

Further aspects and criteria of the selection of the redundancy version are detailed in the description of embodiments and FIGURES.

The present invention gives also an enhancement of the "Retransmission Sequence Number" (RSN) concept, which allows reducing the value range of RSN while still allowing it to be used to determine which packets to combine, at least for most cases, in particular in those cases where the number of retransmissions does not exceed the maximum value of the RSN. The first and/or the second retransmission numbers according to this application can be designed to be a "Retransmission Sequence Number" according to the previous description.

There may now be some cases where the receiver can now no longer tell whether packets have to be combined, but these cases are rare enough and will not severely harm the performance. It is more valuable to reduce the number of bits needed to encode the RSN, say from 3 bits to 2 bits, which gives a significant reduction of the resources needed to transmit this "overhead" information along with the packet data.

DESCRIPTION OF THE INVENTION

Figure 1:
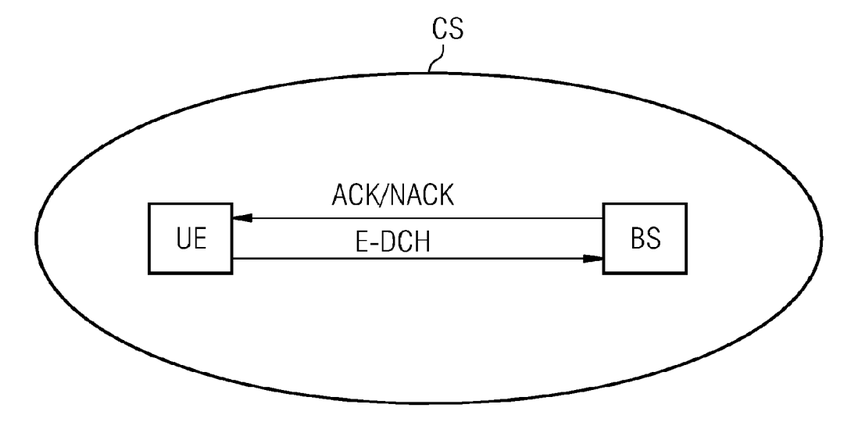
The sole FIGURE shows a connection between a terminal and a base station.

In the FIGURE a terminal U is depicted, which has a connection E-DCH to a base station BS.

The terminal may be any communication device, e.g. as a mobile phone, a PDA (personal digital assistant), a mobile computer etc. The base station may be any central unit in a communication system CS. The communication system can be represented e.g. by a mobile communications network such as UMTS (Universal system of mobile communication), a local area network such as WLAN (wireless local area network) or a broadcast system.

The connection E-DCH may be any data link between the terminal UE and the base station BS, wherein data packets are transmitted. Except of the Enhanced Uplink Dedicated Channel it may be the HS-DSCH (High-Speed Downlink Shared Channel), or . . . or any other data link such as a broadcast connection.

The terminal UE sends data packets to the base station BS. The base station acknowledges the correct or incorrect receipt with a ACK or a NACK, which is sent back to the terminal UE.

In case of a NACK, the terminal UE retransmits the data packet. As laid out above, the data packet is the same from the information content, but may employ a different encoding e.g. a different subset of the coded bits.

In the following description, the retransmission numbers according to this invention are abbreviated as RSN.

According to the invention the RSN concept used as follows: If a new packet is being transmitted (i.e. at the first transmission of a new packet), the RSN is reset to 0.

If a retransmission of a packet is transmitted, and the RSN is still below its maximum value, then the RSN is incremented. If a retransmission of a packet is transmitted, and the RSN has already reached its maximum value, then the RSN is not incremented but remains at the maximum value in contrast to previous proposals. This has the advantage, that the space needed for signaling can be limited to a previously set value.

We name the maximum value of RSN as RSNMAX for the further discussion (RSNMAX can be a maximum retransmission number.

The receiver can combine a received packet with the previously received packet, if e.g. one of the following conditions 1 or 2 holds. For this purpose it will take into account also the RSN of the previously received packet (the last received packet) and the time difference since the reception of that packet (the time difference can be a delay time consisting of a number of retransmission time steps e.g. according to the claims). Note that the time difference is identical to the number of increments of the RSN since that last packet, provided that no new packed has been transmitted and that the limitation of RSN to RSNMAX has not happened yet.

A combination of the data packets is possible, if
1) the RSN is smaller than RSNMAX and the difference in RSN is identical with the difference in transmission time (in this case there was neither an overflow of the RSN nor has a new initial packet been sent) or
2) the RSN is identical to RSNMAX, the last received packet has been received with the difference in time being at most RSNMAX and the RSN of that last packet plus the time difference is at least RSNMAX. In this case there may have been an overflow of the RSN, but the packet received corresponds to the last received packet, otherwise the RSN would have been reset to 0 after that last packet, and would not have been increased to RSNMAX because the time difference since then is too small.

The packets may be not combined for example in the following cases 3 or 4:
3) the RSN is smaller than RSNMAX and the difference in RSN is not identical with the difference in transmission time (in this case there was no overflow of the RSN and a new initial packet been sent, therefore the data relating to the old packet can be safely deleted) or
4) the RSN is identical to RSNMAX and the last received packet has been received with the difference in time being more than RSNMAX. In this case the receiver cannot determine whether the actual and the last received packets are to be combined, i.e. cannot determine whether there have only been retransmissions of this packet been sent, or whether already a new packet and so many retransmissions of this new packet have been sent, so that the RSN has already reached RSNMAX. Therefore, in order to avoid a potential mixing up of data of different packets, the information relating to the old packet will have to be deleted.

In the case that the RSN is identical to RSNMAX it is actually not possible that the last received packet has been received with the difference in time being less than RSNMAX and the RSN of that last packet plus the time difference is smaller than RSNMAX. Consequently, strictly speaking, the RSN of the last packet plus the time difference needs not necessarily be computed and compared to RSNMAX. However it is easy to do and in this case some rare error cases may be detected, where the RSN has been decoded incorrectly. This is unlikely as the RSN will have to be coded/protected suitably anyhow, but as the calculation is so easy, it would be advantageous to do it and to exploit this extra consistency check.

For a further explanation of the present invention, we will present some more detailed examples by reference to the following Table 1:

| T | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| RSN | 0 | 0 | 1 | 2 | 3 | 3 | 3 | 3 | 3 | 3 | 3 | 3 | 0 | 1 | 2 | 3 | 3 | 3 | 3 |
| RX | 0 | — | 1f | — | 3 | — | — | 3 | — | — | — | 3f | 0 | — | 2 | | | | |
| Hyp | 0 | 1 | 2 | | | 0 | 1 | 2 | 0 | 1 | 2 | 3 | 3 | 0 | 1 | | | | |

The table 1 shows:

In the first line the time T (in units of transmission times i.e. time difference of retransmission in the synchronous retransmission protocol). The time T may be denoted in a fixed number of time slots or so called TTI (time transmission interval).

In the second line the actually transmitted RSN.

In the third line the received RSN, which is denoted as RX, if no RSN has been received (e.g. due to interference), this missing receipt is indicated by a dash (-).

Furthermore a "f" indicates that the buffer has been cleared i.e. that the receiver assumes, that the actually received packet cannot be combined with the previous one.

In the fourth line, for explanatory purposes, another potential sequence of transmitted RSN is given to show whether it is possible, that the same RSN has been received but a new packet has already been sent.

According to the present example, at time 0 the RSN is set to 0 and a packet is transmitted.

At time 1 a new packet is transmitted and the RSN is reset to 0 again. This RSN is however not received by the receiver (-).

At time 2, a retransmission of the packet transmitted already at time 1 is transmitted. The receiver recognizes that this packet is not to be combined with the previously received packet, i.e. the packet transmitted at time 0, because the actual RSN is smaller than RSNMAX and the difference of the actual RSN minus the last received RSN (which was 0 at time 0) is 1−0=1 does not match the time difference which is 2 (time 2 minus time 0). This is according to case 3 set out above. Note that if still a retransmission of the packet from time 0 was sent, then the RSN would by now have been incremented to 2 as indicated in the line Hyp. Therefore the receiver can rule out this case, this means, it does not perform a combination.

At time 3 a retransmission is transmitted, but not received.

At time 4 a retransmission is transmitted, the RSN is increased and reaches RSNMAX. The receiver detects this, the time difference since the last received RSN is 2, and the last received RSN (1) plus this time difference gives 3, which is at least RSNMAX. Therefore the packet is combined with the last packet at time 2 according to case 2.

At time 5 to 6 retransmissions are sent, the RSN stays at RSNMAX.

At time 7 a retransmission is sent, still the RSN stays at RSNMAX. The receiver combines this packet with the previously received packet at time 4 according to rule 2: RSN is RSNMAX, the time difference is 3, i.e. at most RSNMAX and the previous RSN plus the time difference is 6 i.e. at least RSNMAX. If a new packet had been sent since time 4, the RSN would have been reset and could have increased at most to 2 since then as shown in the line Hyp.

At time 8 to 10 retransmissions are sent, the RSN stays at RSNMAX.

At time 11 a retransmission is sent, still the RSN stays at RSNMAX. The receiver does not combine this packet with the previously received packet at time 7 according to rule 4: RSN is RSNMAX, the time difference is 11−7=4, i.e. larger than RSNMAX. A new packet could have been sent at time 8, the RSN would have been reset and could have increased to 3 since then as shown in the line Hyp. Therefore the receiver does not know for sure whether the packet received at time 11 can be combined with the packet at time 7 or not, therefore it has to make a conservative assumption i.e. not combine the data. This is indicated by the letter f at time 11 in line 3.

At time 12 a new packet is sent and received and RSN is reset to 0.

At time 13 a retransmission is sent but not received and RSN is incremented to 1.

At time 14 a further retransmission is sent and received and the RSN is incremented to 2. The receiver combines this packet with the previously received packet at time 12 according to rule 1: The RSN 2 is still smaller than RSNMAX and the difference in RSN 2−0=2 is identical with the difference in transmission time 14−12=2. The line Hyp shows that if a new packet had been sent (but missed) at time 13 than the RSN would not be 2 but 1.

Up to now embodiments have been detailed, which are already applicable, if an identical data packet has been retransmitted.

Furthermore, it is possible, that in a HARQ system for the same content not identical packets (this is called "chase combining") but e.g. differently encoded packets are sent, known e.g. as different redundancy versions (also called "incremental redundancy").

In this case, also an indication which redundancy version is transmitted with a given packet can be used. This would additionally increase the overhead information. Therefore the signaling of the redundancy version can be performed implicitly with the RSN or implicitly with the time at which the packet is sent. Both transmitter and Receiver can calculate the applied redundancy version (RV) from either the RSN or transmission time (or equivalently to the transmission time a transmission frame number or connection frame number, also called CFN, the latter will be used in the following without intention to restrict others.)

For the improved RSN as presented in this invention, the determination of the RV can be done as follows: For the values of RSN below RSNMAX, the RV can be calculated from the RSN. However, when RSN reaches RSNMAX, it will remain at this value for all the remaining retransmissions of the packet. Therefore in this case, it is better to calculate the RV not from RSN but from the CFN. In summary, according to this aspect of the invention the RV is calculated from the RSN if RSN<RSNMAX and from CFN if RSN=RSNMAX.

In a further embodiment of the invention, the relation of RV to RSN can be signaled from the receiver to the transmitter before of the transmission, in particular for RSN<RSNMAX.

In a further embodiment there may be a default relationship predefined between transmitter and receiver, which can be replaced by a signaled relationship. The relationship can be signaled e.g. for some values for RSN, in particular for the most often used ones, while for others, e.g. the less often used ones, default values are used. Alternatively, if different packet sizes or coding schemes can be used by the system (this applies in particular for AMC (Adaptive Modulation and Coding) schemes), default values can be used for some sizes/schemes and explicit signaled RV values can be used for others.

Furthermore there are coding methods, which distinguish between two classes of coded bits, namely systematic bits and parity bits. Basically systematic bits correspond to the information to be transmitted while parity bits provide redundancy information. In such cases it may be beneficial to emphasize systematic bits for the initial transmission, but parity bits in at least some of the retransmissions. In this case it is possible to not signal the fact to emphasize systematic bits in the initial transmission. This can save some transmission bandwidth for signaling the RV to RSN relation. Furthermore, it may even be sufficient to always use a predefined RV for the initial transmission and only provide explicit signaling of RV to RSN relations for (some of the) retransmissions. Furthermore, for the case RSN=RSNMAX, it can also be beneficial to emphasize systematic bits. This is in particular true for low encoding rates (i.e. there is a significant redundancy available in a transmitted packet). Then it is possible to also not signal explicitly to emphasize systematic bits for the case RSN=RSNMAX.

The following examples deal with a retransmission of redundancy versions. One important aspect is how the selection of the redundancy version is performed, as this often influences the effectiveness of a combined decoding of a data packet as transmitted originally taken together with a retransmission, which is in this case a redundancy version.

The exact selection of the redundancy version depending on the RSN will be detailed in the following sections. It will be apparent to those versed in the art, that these aspects can be advantageously combined with any aspect of the previously disclosed embodiments. As well, these aspects can be applied independently.

It has been proposed, to select different redundancy versions based on a so called RV index (Redundancy Version Index). The RV index basically defines all the parameters, which are needed to define a specific redundancy version. This indexing enables an easy reference to a particular redundancy version, because only a single parameter i.e. the RV index needs to be specified. This specification is particularly transmitted or "signaled" from the terminal UE to the base station BS. The general aspects such as the general signaling architecture regarding E-DCH are discussed in R1-041408 3GPP TR 25.808 V0.2.3 (2004-October) Technical Report 3rd Generation Partnership Project; FDD Enhanced Uplink; Physical Layer Aspects.

One proposal for a relation between the RV index and derived parameters is given in R1-041354, Editor (Siemens), "CR 25.212—Introduction of E-DCH", November 2004, Shin Yokohama, Japan in its section "4.8.4.3 HARQ Rate Matching Stage".

In particular the relation of the parameters s and r to the E-DC-RV index is relevant:

The parameters of the rate matching stage depend on the value of the RV parameters s and r. The s and r combinations corresponding to each RV allowed for the E-DCH are listed in the following Table 1. The first transmission attempt of a transport block shall use a RV that emphasizes the systematic bits (RV with s=1). Higher layer signaling is used to control the number of redundancy versions the UE shall use.

TABLE 1

| RV for E-DCH | | |
|---|---|---|
| E-DCH RV Index | S | r |
| 0 | 1 | 0 |
| 1 | 0 | 0 |
| 2 | 1 | 1 |
| 3 | 0 | 1 |

The following parameters are used:
$N_{sys}=N_{p1}=N_{p2}=N_{e,j}/3$
$N_{data}=N_{e,data,j}$
$r_{max}=2$ The exact way how these parameters are used to determine the actually used rate-matching pattern are described in the above cited section of R1-041354, Editor (Siemens), "CR 25.212—Introduction of E-DCH", November 2004, Shin Yokohama, Japan. This way can be applied also for the various embodiments presented here.

In particular, the following two sections of this document shows, how the rate matching pattern is derived. The first citation, chapter 4.2.7.5 "Rate matching pattern determination" deals with the exact determination of the rate matching pattern based on the parameters $e_{plus}$, $e_{minus}$ and $e_{ini}$. Of these parameters $e_{ini}$ describes the initial error between the current or actual and the desired puncturing ratio, $e_{plus}$ a stepwidth for changing the error and, $e_{minus}$ another step width, used in the rate matching algorithm. The section Chapter 4.5.4.3 "HARQ Second Rate Matching Stage" describes how to calculate these parameters from the input parameters $N_{sys}$, $N_{data}$ and $r_{max}$, wherein $N_{sys}$ denotes the number of systematic bits, that is bits carrying information in contrast to parity bits used for encoding, $N_{data}$ denotes the total number of bits, i.e. parity bits and systematic bits and $r_{max}$ denotes the maximum value of r plus one.

In Chapter 4.5.4.3. from this document shows how the parameters, in particular $e_{plus}$, $e_{minus}$ and $e_{ini}$ for the algorithm in section 4.2.7.5 are set:

The parameter s specifies whether the RV is self decodable, this means decodable if only this RV is considered. Decodable means in this respect, that the information content of the data packet, represented by the redundancy version can be found out. If s=1, then when puncturing during rate matching the so called systematic bits are prioritized over the parity bits of the turbo code. Such a redundancy version is typically self decodable, that means, that it can be decoded by itself, unless of course the reception is too noisy. This is not the case when s=0 (parity bits are prioritized), where it can happen that a RV cannot be decoded by itself, even in the absence of noise, but only together with another RV. Therefore the first transmission of a packet should always be self-decodable, i.e. employ s=1. During soft-handover (SHO) it may happen, that one base station does receive the packets from the mobile station up to a certain time, while another base station receives the packets after that time. This happens, if the instantaneous path loss to the second base station becomes better than the path loss to the first one, which can happen easily due to fast fading. Path loss is the degradation of a signal transmitted over a certain connection between e.g. a terminal and a base station. The signal takes a certain way, the path. Due to reflection, interferences etc it is subject to a degradation.

If the path loss to the second base station becomes better, it is advantageous, if all the redundancy versions are self-decodable, as The second base station might otherwise not be able to immediately decode the packets after such a switch, as it might not have received the initial transmission of a data packet, which is self decodable, but only later transmissions, which are by itself not self decodable:

This intention is also covered in the sections 4.2.7.5 and 4.5.4.3 described above.

The inventors have found out, that surprisingly this means not necessarily, that s=1 should be selected for every RV, if the connection or data transmission is currently in SHO. The reason is, that s=0 only creates a non-self-decodable RV if puncturing is applied as described above. By puncturing the canceling of individual bits is described. Puncturing is done in order to reduce the overall number of bits, e.g. to adapt the overall number to a fixed capacity of a transmission. The puncturing of bits is done such, that no or only as little as possible information is lost. Therefore often mainly parity bits are punctured.

If now repetition is performed, then all coded bits are transmitted anyhow, some of them are even repeated. Therefore s=0 can be safely selected. In this case s=0 simply selects another redundancy version than s=1.

Using different RVs enhances the performance (so called incremental redundancy (IR)) and the more different RVs can be selected the better. So the general rule to use s=1 in soft handover as given in the citation is actually not beneficial in this case but should be modified for the case of repetition.

Therefore according to an advantageous embodiment the selection of redundancy versions is based not only on the RSN but also on the fact whether puncturing or repetition is used for rate matching.

Another criterion which is taken into account additionally or alternatively is the coding rate. The coding rate is the number of bits before the coding divided by the number of bits after coding and after rate matching. Rate matching is the puncturing or repeating of bits in order to achieve a desired final number of data in a certain time interval or correspondingly a desired data rate.

Typically, for E-DCH, so called "turbo codes" are used for coding of the payload data. Payload data are the data actually carrying information, in contrast for data used for signaling etc. These turbo codes have a code rate of (approximately) 1/3 i.e. for every bit to be coded three coded bits are generated, namely one systematic bit and two parity bits. If the code rate (after rate matching) is smaller than 1/3 then repetition is used during rate matching, if the code rate is larger than 1/3 then puncturing is used. Therefore the decision which RVs to use, and in particular whether to use s=0 can be based advantageously on the (coding) rate.

In this context it should be noted, that the code rate of a turbo code without rate matching is not exactly 1/3 but slightly lower, because additionally so called "termination bits" are appended at the end of the encoded data. However, for the purpose of the embodiments described in the context of this application, this difference is small enough to be irrelevant. Therefore, in the detailed embodiments it is possible to either compute the coding rate taking the termination bits into account or not. The result will generally be equal.

According to a further advantageous embodiment the following selection of RVs based on the RSN and the code-rate is realized:

TABLE 2

Relation between RSN value and E-DCH RV Index

| RSN value | coding rate | | |
|---|---|---|---|
| | $1/3 <$ rate $< 1/2$ E-DCH RV Index | $1/2 \leq$ rate $< 5/6$ E-DCH RV Index | rate $\geq 5/6$ or rate $\leq 1/3$ E-DCH RV Index |
| 0 | 0 | 0 | 0 |
| 1 | 2 | 3 | 1 |
| 2 | 0 | 2 | 3 |
| 3 | $\lfloor TTIN/N_{ARQ} \rfloor$ mod 2 *2 | $\lfloor TTIN/N_{ARQ} \rfloor$ mod 3 | $\lfloor TTIN/N_{ARQ} \rfloor$ mod 4 |

In table 2 the redundancy version Index for the E-DCH is shown for various coding rates and different retransmission sequence numbers RSN.

The E-DCH RV Index is computed from the RSN value, the used coding rate and, if RSN=3, also from the TTIN (TTI(time transmission interval)-number). For UMTS, if choosing 10 ms for a TTI, then the TTI number is equal to the connection frame number CFN, for 2 ms TTI we define $$TTIN = 5*CFN + \text{subframe number}$$

where the subframe number counts the five TTIs which are within a given CFN, stating from 0 for the first TTI to 4 for the last TTI. In other words, a subframe has for UMTS a length of 5 TTIs.

NARQ is the number of Hybrid ARQ processes that is how many transmissions of individual data packets are performed in parallel. E.g. there is the transmission and retransmission of a data packet A. At the same time transmission and retransmission of data packet B or further data packets has already begun. The usage of the TTIN instead of the CFN is necessary, if a CFN contains more than one TTI in order to distinguish the TTIs within one CFN. This depends on the set up of the individual data connection and the system within which the data connection is established. Therefore, the conditions can be generalized for other numbers of TTIs contained in a frame. The division by the number of NARQ, the number of ARQ processes, is necessary, because a retransmission will not be scheduled immediately after the previous transmission, but only after reception of the corresponding acknowledgement (ACK or NACK). As explained above, in the meantime data packets are transmitted using different HARQ processes.

As can be seen when comparing the last and the second column of Table 1 above, E-DCH RV index is always chosen so that s=1 (i.e. E-DCH RV index is 0 or 2, compare Table 2 above) is used in the second column. In the last column which is used if the rate is smaller than 1/3, i.e. for repetition, s=0 is used as well (E-DCH RV index 1 and/or 3).

Therefore, according to a further embodiment s=1 for 1/3<rate<1/2 is used as shown in table 2. According to another embodiment s=0 is not used, even if the data link or the data transmission is not in SHO. In this way, it is not necessary to establish a common understanding whether SHO is used or not, which facilitates e.g. the signaling for the following reasons:

Because the initiation of SHO always is somewhat delayed due to the delay of the associated signaling, and because this signaling delay is not necessarily equal for the signaling from the RNC (radio network controller), from where the handover is typically initiated, to the base stations and the terminals or mobile stations, a perfect synchronization of a common understanding is cumbersome. By the above embodiment this necessity of determining whether a SHO is currently performed is avoided.

Selecting only two RVs for this case is not disadvantageous as it was considered before, because for these rates two RVs are sufficient to transmit: Via two retransmissions, all bits which are generated by the turbo coder can be transmitted: For rate 1/2, after rate matching, all systematic and half the parity bits are transmitted in one RV in the other RV, again all systematic and the other half of the parity bits are transmitted. Therefore the usage of a non-self-decodable RV, which could transmit even more parity bits, is not necessary for this code rate but only for higher code rates. The inventors have found out that prior art methods would be disadvantageous in the aspect of systematic bits, because in general the systematic bits should be emphasized more than the parity bits, also when taking multiple RVs together.

Therefore only for higher code rates than 1/2, we propose to use s=0, i.e. non self-decodable RVs for the retransmission. In particular, if 1/2≤rate<5/6 we propose to use one non self-decodable RV, see the middle column in table 9. At code rate 2/3 the first RV, which is self-decodable contains all systematic bits and 1/4 of the parity bits, the second RV, which is non-self-decodable contains purely parity bits i.e. 3/4 of the parity bits. Therefore, up to rate (2/3), it is possible to transmit all bits with two redundancy versions. At higher rates, it is necessary to use more than one non-self-decodable RV: If the code rate is one, only the systematic bits are transmitted in the initial transmission, the first and second retransmissions contain each 50% of the parity bits. So one non-self-decodable RV is ideal for Rate 2/3 and two non-self-decodable RV are ideal for rate 1. As 5/6 is the arithmetic mean of 2/3 and 1, we propose to use this value for the transition between one and two non-self-decodable transmissions. Obviously other thresholds are possible as well, down to 2/3 as 2/3 is the maximum rate where all parity bits can be transmitted with on self-decodable and one non-self-decodable transmission. Likewise the threshold of rate 1/2 can also be set somewhat higher, e.g. at the arithmetic mean between 1/2 and 2/3 which is 7/12 or any value between 1/2 and 7/12. Furthermore it was decided that the UE (User Equipment, a synonym for mobile station) should only use a given maximum data rate when in Soft Handover. The reason is that mobile stations in soft handover will create interference in two cells, so limiting their data rates beneficially influences the situation in two cells. At this maximum data rate a certain coding rate will apply. So in an embodiment of this invention, the transition point i.e. the minimum coding rate at which also non-self-decodable transmission are used, can be selected to correspond to the maximum data rate which is admissible in SHO.

In the right column, for code rates above 5/6, as was show above two non-self-decodable RVs are proposed, see table x.

As stated above, the RVs are explicitly allocated to the first three transmissions, where RSN<RSNMAX. If RSN reaches RSNMAX, which is 3 in the example given above, the Redundancy version is calculated based on the TTIN. This has the advantage, that different RVs are used for successive transmissions, even if always the same RSN (i.e. RSNMAX) is used. Only for the first transmission with RSN=RSNMAX, it would be advantageous to select the optimum RV, however then always this RV would have to be used after RSN reaches RSNMAX, which is clearly undesirable. For the different rates some care needs to be taken, when selecting the formula that selects the RVs, this is detailed below:

If 1/3<rate<1/2, then only self-decodable RVs are used, so only these should be selected as well for RSN>RSNMAX. This is realized by ⌊TTIN/NARQ⌋ mod 2*2 in table x above.

If 1/2≤rate<5/6 (or generally in the middle column), one non self-decodable transmission is needed. Still the systematic bits should be prioritized, therefore two self-decodable RVs are used. For RSN=1 the E-DCH RV index 3 is selected, while for RSN=3, via the formula, the RVs 0, 1, 2 are selected cyclically. In this way some further gain can be reached, as different non-self-decodable RVs are used for RSN=1 and RSN=3, this gives some additional IR gain. This is realized by ⌊TTIN/NARQ⌋ mod 3 in table x above.

If the rate≥5/6 (or 2/3 as explained above), then two non-self-decodable RVs are necessary to cover all parity bits. In order to also emphasize the systematic bits in this case, we propose to use 4 RVs for RSN=3, two non-self-decodable ones, and two (not only the minimum of 1) self-decodable RV. This is realized by ⌊TTIN/NARQ⌋ mod 4.

Here ⌊ ⌋ means rounding down to the largest integer, which is not larger than x, also sometimes called floor(x) or int(x).

In the following embodiments a further, different, enhancement to the RSN scheme is employed, which can again be used either in combination with or independent from the other enhancements presented in this invention.

In R1-041339, Panasonic, Downlink signaling related issues for Enhanced Uplink, November 2004, Shin Yokohama, Japan it was proposed, that a terminal UE should retransmit the initial redundancy version, if the E-DCCH data could not be decoded. The E-DCCH carries overhead information related to the payload-data, e.g. the used transport format i.e. the number of payload bits, and is necessary to decode the payload-data. So if the base station could not decode the E-DCCH it will not be able to make any use of the data transmitted on E-DCDCH. The base station can determine that the E-DCCH was not detected correctly e.g. if a CRC (cyclic redundancy check is appended to the E-DCCH data. If the base station cannot make use of the first RV, then in R1-041339, Panasonic, Downlink signaling related issues for Enhanced Uplink, November 2004, Shin Yokohama, Japan it was proposed to retransmit the first RV again, in order to make sure that the first RV which is actually available for the base station is a self-decodable transmission. In this document several proposals are made how this is signaled to the mobile station, e.g. by introduction of a third state apart from ACK and NACK. In the context of the described embodiments the exact way of signaling is not critical, therefore any signaling used in a HARQ process can be applied.

In the frame of this application this signaling is called CNAK (Control-NACK). However, this document does not disclose any information how the re-selection of the first RV shall be realized in conjunction with the RSN scheme.

In this document in particular the section "Node B reception scenarios" is relevant, in particular the citation below, which starts at the third paragraph of this section:

The table below shows 3 different scenarios, which can occur when UE sends the initial transmission of a data packet. The second column in the table describes the reception status at Node B for each scenario, the third column shows the preferred UE behavior in such situation.

| | UE transmission | Node B reception status | UE behavior depending on Node B reception |
|---|---|---|---|
| 1 | E-DPCCH sent with self-decodable RV | Node B decodes E-DPCCH, but CRC of E-DPCCH fails | UE retransmits self-decodable RV of the data packet. |
| 2 | E-DPCCH sent with self-decodable RV | Node B successfully decodes E-DPCCH, CRC on E-DPDCH fails | UE sends next RV of the data packet according to the RSN |
| 3 | E-DPCCH sent with self-decodable RV | Node B successfully decode both E-DPCCH and E-DPDCH | UE sends next RV of the data packet |

In case the E-DPCCH cannot be decoded correctly, as listed as the first scenario in the table, Node B cannot process the data received on E-DPDCH. A decoding of the received data is not possible and therefore Node B discards the data. In our view it would be beneficial to transmit the self-decodable RV again in such a situation. When UE sends retransmissions according to the specified RV sequence, a decoding of the data packet is only possible after the transmission of the next self-decodable RV, which may lead to an increased delay. Therefore we prefer to retransmit the self-decodable RV (initial transmission) in such a scenario.

Scenario 2 describes the case when Node B decodes the E-DPCCH correctly, but the CRC on the E-DPDCH fails. Here Node B can use the received energy on the E-DPDCH when combining it with further retransmissions. Therefore UE shall retransmit according to the specified RV sequence in this case. We propose that the UE behavior is different depending on whether the 1 st or 2nd scenario has occurred.

There are basically two possibilities: One possibility would be to assign the first RV not only to RSN=0 but also to RSN=1 in this case, consequently, the next RVs would also be shifted to the respective next RSN-value. While this approach is feasible, there is a a better approach used in an embodiment:

If the mobile station receives a CNAK, then the next transmission is sent again with RSN=0 and consequently with the first, self-decodable RV. At first sight this may seem to imply that the RSN protocol as described above could no longer be used in this case. However, it can be enhanced to also support this case: Both base station and mobile station are aware of this situation via the CNAK signaling. Both can therefore take this fact into account for the RSN-protocol. Furthermore, the base station may anyhow decide to flush the soft buffer as it could not make use of the first transmission, this is already in accordance with the handling of the RSN-protocol. If this happens in Soft-Handover, then other base stations are typically not aware that the first base station has transmitted a CNAK. However, due to the RSN-protocol they can detect that a new RSN=0 transmission is sent and flush their soft buffer. While flushing the buffer is not strictly necessary in this case, it has the effect that the other base stations become aware of the fact, that the RV sequence is reset, and will therefore use the correct RV. Otherwise, these other base stations would use a wrong RV, consequently they would not have any chance to decode the packet, this would be a waste of resources. Even if one of the other base stations in soft handover could detect the packet correctly already for the first transmission, the RSN protocol still works fine: Then this base station sends an ACK at the same time when the first base station transmits a CNAK. The mobile station will then transmit the next packet, as usual using RSN=0. The first base station will not be aware of the fact, that the second base station has acknowledged the first packet and therefore is not aware that a new packet is transmitted. However, as it will anyhow flush the buffer from the first packet it does not matter whether now the first or the next packet is transmitted.

Even if the mobile station or the terminal UE erroneously misinterprets the CNAK as an ACK, the base station can still correctly receive the next packet. The first packet is lost in this case, but not due to the enhancement of the RSN-protocol but simply due to the false reception of the ACK. This error case is already possible without the RSN-protocol enhancement, when a NAK is miss-interpreted as an ACK, i.e. the enhanced RSN protocol does not cause any further degradation.

This invention has presented enhancements to the RSN. It should be noted that there are also other possibilities to provide similar functionality by other means or somewhat different signaling. One such proposal is the NDI (New Data Indicator). The NDI is incremented modulo a maximum value for every new packet but is identical for retransmission of a packet. The NDI scheme may be more robust in cases where there are many retransmissions, because then the NDI is only incremented seldom and there is less risk that it becomes no more unambiguous (e.g. due to wrap around).

According to a further aspect of this invention, either the RSN or NDI scheme can be used depending on properties of the connection. That means that even in a single connection sometimes RSN and sometimes NDI can be used depending on the property. Such properties may include the fact whether the connection is or is not in Soft Handover, or the used packet size or coding rate.

In a preferred embodiment the selected property can be determined by the transmitter and receiver without additional explicit signaling. In this case no extra signaling overhead is introduced.

It will be apparent to those versed in the art, that the presented invention can be combined beneficially by combining aspects presented in this application with one another or with other known procedures. The invention which was described by example above is therefore considered to be also applicable to those cases. In particular the examples and the description should not be understood to limit the scope of the invention.

In the following further examples, explanations, embodiments and variants of the present invention are given:

In the last meeting substantial progress regarding the HARQ definition for E-DCH was made. An important agreement was to have a synchronous protocol with synchronous retransmissions and to have HARQ with IR and Chase combining.

Further while operating IR it was agreed that the redundancy versions are taken in a given order and that the first transmission always emphasizes the systematic bits (s=1). For retransmissions in non SHO both emphasizing and non emphasizing of systematic bits should be possible (s=0 or s=1).

Another agreement for SHO was that the utilization of transmissions always emphasizing the systematic bits (s=1) is generally considered to be beneficial.

Starting from these facts and the agreement that the RV may be linked to the CFN for some E-TFCs and explicitly signaled for other E-TFCs this contribution proposes a solution for the signaling of the HARQ related information.

HARQ Related Signaling Information

The HARQ related signaling information is transmitted with every E-DCH packet transmission together with the E-TFC information. Its function is to inform the Node B about the used redundancy version (Xrv value) needed for the de-rate matching as well as to trigger the flushing of the Node B soft buffer.

The redundancy versions and the ordering in which the redundancy versions are applied should be controlled by the network e.g. through higher layer signaling or it can be specified for every TFC using a fixed mapping rule. The rule is known to both the UE and the network and can implemented "hard-wired". In our view for each TFC three redundancy versions (one for the initial transmission, one for the first and one for the second retransmission) should be specified or signaled from higher layers.

In the following due to the different requirements regarding the reliability of the new data indication and the different link efficiency gains for the RV selection in SHO and no SHO we separate the discussion for both cases.

Signaling in Case of No SHO

In case of no SHO we propose a 2 bit RSN as described inR1-040958, Ericsson, "E-DCH Physical Layer Hybrid ARQ Processing", Prague, Czech Republic, August 2004, where it is disclosed to include a RSN in uplink signaling and derive the Redundancy Version based on the RSN.

This including of the RSN in signaling has also been described above in the context of the introduction of the RSN.

Thus the applied redundancy version is signaled from the UE to the Node B. Additionally the RSN provides the functionality of new data indication (in case the RSN=0 the soft buffer is indicated to be flushed). The RSN is incremented with every retransmission and set to 0 with every initial transmission. In case the number of retransmissions exceeds two the RSN is set to 3 for all further retransmissions. This has the advantage that the number of bits for the RSN can be lower than log 2(Nmax) without losing IR gain since the number of different RVs is typically lower than the maximum number of transmissions Nmax. For RSN=3 the RV selection is CFN based to achieve further gain.

Signaling in Case of SHO

As described in R1-040906, Motorola, "Synchronous HARQ and reliable signaling during SHO (Enhanced Uplink) ", Prague, Czech Republic, August 2004 in case of SHO specific TFCs are chosen by the UE. Generally the SHO TFCs provide lower rates. For lower rates it was already shown during the study item phase that the IR link efficiency gain compared to Chase combining is around 0.3 dB. However the performance difference between different IR schemes and also between IR schemes with different RV orderings is negligible small, as it has been shown in R1-040719, Qualcomm, "Link Performance with different RV for Low Data Rates", Cannes, France, June 2004.

Consequently to achieve the best performance also in SHO we propose to use specific TFCs together with IR. To specify an explicit rule for the RV selection is not reasonable due to the negligible differences of the IR schemes. Therefore we propose to do the RV selection implicitly and based on the CFN similar as described already in several other contributions [2, 3].

In SHO then the 2 bit RSN as described for the no SHO case is no longer needed and can be reused. Keeping in mind that the most important issue for the HARQ related signaling in SHO is to avoid Node B buffer corruption we propose to reuse the 2 RSN bits as a 2 bit NDI. In contrast to the RSN, which is incremented per retransmission, the NDI is incremented at the UE with every initial transmission. Compared to the RSN the NDI provides a higher reliability especially in case the residual BLER after the first retransmission is targeted to 1%).

SUMMARY

In this document we propose to use only 2 bits for the HARQ related UL E-DCH signaling information used to provide the new data indication and the RV selection functionality.

Depending on the chosen TFC the counter is incremented on a per retransmission (=RSN) or a per initial transmission basis (=NDI) to support the NDI or RV selection functionality as good as possible.

Background for this solution is the given fact, that in case of SHO the NDI reliability is much more critical than in non SHO and that the RV selection in non SHO has much more influence on the performance than in SHO.

Further the proposal comprises also the RV selection in SHO, which is done implicitly using the CFN e.g. as described in [2,3]. In case of no SHO the RVs for the initial transmission and the first and second retransmission is signaled by the network whereas the actual usage is indicated by the UEs RSN.

ABBREVIATIONS/ACRONYMS USED IN THE DESCRIPTION

E-DCH: Enhanced Dedicated Channel, basically an improvement of the existing UMTS uplink channel.
E-DCDH: Enhanced Dedicated Data Channel, carries the payload-data of E-DCH.
E-DCCH: Enhanced Dedicated Control Channel, carries overhead data (L1 signaling) for E-DCDCH.
IR: Incremental Redundancy
SHO: Soft Handover
CFN: Connection Frame Number
E-TFC: Enhanced Transport Format Combination
UE: User Equipment, mobile station.
log 2: logarithm base 2
UL: Uplink
RSN: Retransmission Sequence Number
RSNMAX: Maximum value of Retransmission Sequence Number
TTIN: TTI-number
TTI: Transmission Time Interval
CFN: Connection Frame Number
ARQ: Automated Retransmission reQestHARQ: Hybrid ARQ
ACK: Acknowledge
NACK: Not Acknowledge
$\lfloor x \rfloor$: floor(x) i.e. the largest integer which is not larger than x.
RV: Redundancy Version
NARO: Number of Hybrid ARQ processes
UE: User Equipment, a synonym for mobile station or terminal

What is claimed is:

1. A telecommunications device, comprising:
 transmitter circuitry configured to:
  encode an information content to generate a set of systematic bits and a set of parity bits;
  generate data packets using a rate matching algorithm;
  generate, using the rate matching algorithm to prioritize systematic bits of the set of systematic bits over parity bits of the set of parity bits, a first data packet of the data packets containing a first subset of the set of systematic bits and a first subset of the set of parity bits, the first data packet having a coding rate;
  transmit, at a first time, the first data packet from the telecommunications device for receipt by a receiver;
  when the coding rate of the first data packet is less than 1/2, the transmitter circuitry being further configured to:
   generate, in the event a confirmation of incorrect receipt of the first data packet is communicated to the telecommunications device, using the rate matching algorithm to prioritize systematic bits of the set of systematic bits over parity bits of the set of parity bits, a second data packet of the data packets containing the first subset of the set of systematic bits and a second subset of the set of parity bits;
   transmit, at a second time following the first time, the second data packet from the telecommunications device for receipt by the receiver;
   generate, in the event a confirmation of incorrect receipt of the second data packet is communicated to the telecommunications device, using the rate matching algorithm to prioritize systematic bits of the set of systematic bits over parity bits of the set of parity bits, a third data packet of the data packets containing the first subset of the set of systematic bits and the first subset of the set of parity bits; and
   transmit, at a third time following the second time, the third data packet from the telecommunications device for receipt by the receiver; and
  when the coding rate of the first data packet is greater than or equal to 1/2, the transmitter circuitry being further configured to:
   generate, in the event a confirmation of incorrect receipt of the first data packet is communicated to the telecommunications device, using the rate matching algorithm to prioritize parity bits of the set of parity bits over systematic bits of the set of systematic bits, a fourth data packet of the data packets containing a fourth subset of the set of parity bits;
   transmit, at a fourth time following the first time, the fourth data packet from the telecommunications device for receipt by the receiver;
   generate, in the event a confirmation of incorrect receipt of the fourth data packet is communicated to the telecommunications device, using the rate matching algorithm to prioritize systematic bits of the set of systematic bits over parity bits of the set of parity bits, a fifth data packet of the data packets containing the first subset of the set of systematic bits and the fourth subset of the set of parity bits; and
   transmit, at a fifth time following the fourth time, the fifth data packet from the telecommunications device to the receiver.

2. The telecommunications device of claim 1, wherein the first subset of the set of systematic bits includes the entire set of systematic bits.

3. The telecommunications device of claim 1, wherein, when the coding rate of the first data packet is less than 1/2, the transmitter circuitry being further configured to:
 generate, in the event a confirmation of incorrect receipt of the third data packer is communicated to the telecommunications device, using the rate matching algorithm to prioritize systematic bits of the set of systematic bits over parity bits of the set of parity bits, a sixth data packet of the data packets containing the first subset of the set of systematic bits and a sixth subset of the set of parity bits;
 transmit, at a sixth time following the fifth time, the sixth data packet from the telecommunications device for receipt by the receiver;
 generate, in the event a confirmation of incorrect receipt of the sixth data packet is communicated to the telecommunications device, using the rate matching algorithm to prioritize systematic bits of the set of systematic bits over parity bits of the set of parity bits, a seventh data packet of the data packets containing the first subset of the set of systematic bits and a seventh subset of the set of parity bits; and
 transmit, at a seventh time following the sixth time, the seventh data packet from the telecommunications device for receipt by the receiver.

4. The telecommunications device of claim 1, wherein the transmitter circuitry being further configured to:
 generate and transmit the second data packet and the third data packet when the coding rate of the first data packet is in a range less than 1/2 and greater than 1/3; and
 generate and transmit the fourth data packet and the fifth data packet when the coding rate of the first data packet is in a range greater than or equal to 1/2 and less than 5/6.

5. The telecommunications device of claim 1, wherein the transmitter circuitry being further configured to transmit from the telecommunications device for receipt by the receiver a two bit retransmission sequence number (RSN) value along with the first data packet and along with those of the second, third, fourth, and fifth data packets as are transmitted.

6. The telecommunications device of claim 5, wherein:
 the RSN value is zero (0) for the first data packet;
 the RSN value is one (1) for those of the second and fourth data packets as are transmitted; and
 the RSN value is two (2) for those of the third and fifth data packets as are transmitted; and
 in the event a confirmation of incorrect receipt of the third data packet or the fifth data packet is communicated to the telecommunications device, the transmitter circuitry being further configured to:
  generate and transmit to the receiver one or more additional retransmission data packets, an RSN value three (3) being transmitted to the receiver along with each data packet of the one or more additional retransmission data packets as are transmitted.

7. A method, comprising:
 encoding, at a telecommunications device, an information content to generate a set of systematic bits and a set of parity bits;
 generating, at the telecommunications device, data packets using a rate matching algorithm;
 generating, at the telecommunications device and using the rate matching algorithm to prioritize systematic bits of the set of systematic bits over parity bits of the set of parity bits, a first data packet of the data packets containing a first subset of the set of systematic bits and a first subset of the set of parity bits, the first data packet having a coding rate;

transmitting, at a first time, the first data packet from the telecommunications device for receipt by a receiver;

when the coding rate of the first data packet is less than 1/2, the method further comprising:

generating, at the telecommunications device and in the event a confirmation of incorrect receipt of the first data packet is communicated to the telecommunications device, using the rate matching algorithm to prioritize systematic bits of the set of systematic bits over parity bits of the set of parity bits, a second data packet of the data packets containing the first subset of the set of systematic bits and a second subset of the set of parity bits;

transmitting, at a second time following the first time, the second data packet from the telecommunications device for receipt by the receiver;

generating, at the telecommunications device and in the event a confirmation of incorrect receipt of the second data packet is communicated to the telecommunications device, using the rate matching algorithm to prioritize systematic bits of the set of systematic bits over parity bits of the set of parity bits, a third data packet of the data packets containing the first subset of the set of systematic bits and the first subset of the set of parity bits; and transmitting, at a third time following the second time, the third data packet from the telecommunications device for receipt by the receiver; and when the coding rate of the first data packet is greater than or equal to 1/2, the method further comprising:

generating, at the telecommunications device and in the event a confirmation of incorrect receipt of the first data packet is communicated to the telecommunications device, using the rate matching algorithm to prioritize parity bits of the set of parity bits over systematic bits of the set of systematic bits, a fourth data packet of the data packets containing a fourth subset of the set of parity bits;

transmitting, at a fourth time following the first time, the fourth data packet from the telecommunications device for receipt by the receiver;

generating, at the telecommunications device and in the event a confirmation of incorrect receipt of the fourth data packet is communicated to the telecommunications device, using the rate matching algorithm to prioritize systematic bits of the set of systematic bits over parity bits of the set of parity bits, a fifth data packet of the data packets containing the first subset of the set of systematic bits and the fourth subset of the set of parity bits; and transmitting, at a fifth time following the fourth time, the fifth data packet from the telecommunications device to the receiver.

8. The method of claim 7, wherein the first subset of the set of systematic bits includes the entire set of systematic bits.

9. The method of claim 7, wherein, when the coding rate of the first data packet is less than 1/2, the method further comprising:

generating, at the telecommunications device and in the event a confirmation of incorrect receipt of the third data packet is communicated to the telecommunications device, using the rate matching algorithm to prioritize systematic bits of the set of systematic bits over parity bits of the set of parity bits, a sixth data packet of the data packets containing the first subset of the set of systematic bits and a sixth subset of the set of parity bits;

transmitting, at a sixth time following the fifth time, the sixth data packet from the telecommunications device for receipt by the receiver;

generating, at the telecommunications device and in the event a confirmation of incorrect receipt of the sixth data packet is communicated to the telecommunications device, using the rate matching algorithm to prioritize systematic bits of the set of systematic bits over parity bits of the set of parity bits, a seventh data packet of the data packets containing the first subset of the set of systematic bits and a seventh subset of the set of parity bits; and transmitting, at a seventh time following the sixth time, the seventh data packet from the telecommunications device for receipt by the receiver.

10. The method of claim 7, the method further comprising:

generating and transmitting, at the telecommunications device, the second data packet and the third data packet when the coding rate of the first data packet is in a range less than 1/2 and greater than 1/3; and generating and transmitting, at the telecommunications device, the fourth data packet and the fifth data packet when the coding rate of the first data packet is in a range greater than or equal to 1/2 and less than 5/6.

11. The method of claim 7, the method further comprising transmitting from the telecommunications device for receipt by the receiver a two bit retransmission sequence number (RSN) value along with the first data packet and along with those of the second, third, fourth, and fifth data packets as are transmitted.

12. The method of claim 11, wherein:

the RSN value is zero (0) for the first data packet;

the RSN value is one (1) for those of the second and fourth data packets as are transmitted; and the RSN value is two (2) for those of the third and fifth data packets as are transmitted; and in the event a confirmation of incorrect receipt of the third data packet or the fifth data packet is communicated to the telecommunications device, the method further comprising:

generating and transmitting to the receiver one or more additional retransmission data packets, an RSN value three (3) being transmitted to the receiver along with each data packet of the one or more additional retransmission data packets as are transmitted.

13. A non-transitory computer-readable medium including code for performing a process to be executed on a computer, the process comprising:

encoding, at a telecommunications device, an information content to generate a set of systematic bits and a set of parity bits;

generating, at the telecommunications device, data packets using a rate matching algorithm;

generating, at the telecommunications device and using the rate matching algorithm to prioritize systematic bits of the set of systematic bits over parity bits of the set of parity bits, a first data packet of the data packets containing a first subset of the set of systematic bits and a first subset of the set of parity bits, the first data packet having a coding rate;

transmitting, at a first time, the first data packet from the telecommunications device for receipt by a receiver;

when the coding rate of the first data packet is less than 1/2, the method further comprising:

generating, at the telecommunications device and in the event a confirmation of incorrect receipt of the first data packet is communicated to the telecommunications device, using the rate matching algorithm to prioritize systematic bits of the set of systematic bits over parity bits of the set of parity bits, a second data packet of the data packets containing the first subset of the set of systematic bits and a second subset of the set of parity bits;

transmitting, at a second time following the first time, the second data packet from the telecommunications device for receipt by the receiver;

generating, at the telecommunications device and in the event a confirmation of incorrect receipt of the second data packet is communicated to the telecommunications device, using the rate matching algorithm to prioritize systematic bits of the set of systematic bits over parity bits of the set of parity bits, a third data packet of the data packets containing the first subset of the set of systematic bits and the first subset of the set of parity bits; and transmitting, at a third time following the second time, the third data packet from the telecommunications device for receipt by the receiver; and when the coding rate of the first data packet is greater than or equal to 1/2, the method further comprising:

generating, at the telecommunications device and in the event a confirmation of incorrect receipt of the first data packet is communicated to the telecommunications device, using the rate matching algorithm to prioritize parity bits of the set of parity bits over systematic bits of the set of systematic bits, a fourth data packet of the data packets containing a fourth subset of the set of parity bits;

transmitting, at a fourth time following the first time, the fourth data packet from the telecommunications device for receipt by the receiver;

generating, at the telecommunications device and in the event a confirmation of incorrect receipt of the fourth data packet is communicated to the telecommunications device, using the rate matching algorithm to prioritize systematic bits of the set of systematic bits over parity bits of the set of parity bits, a fifth data packet of the data packets containing the first subset of the set of systematic bits and the fourth subset of the set of parity bits; and transmitting, at a fifth time following the fourth time, the fifth data packet from the telecommunications device to the receiver.

14. The non-transitory computer-readable medium of claim 13, wherein the first subset of the set of systematic bits includes the entire set of systematic bits.

15. The non-transitory computer-readable medium of claim 13, wherein, when the coding rate of the first data packet is less than 1/2, the process further comprising:

generating, at the telecommunications device and in the event a confirmation of incorrect receipt of the third data packet is communicated to the telecommunications device, using the rate matching algorithm to prioritize systematic bits of the set of systematic bits over parity bits of the set of parity bits, a sixth data packet of the data packets containing the first subset of the set of systematic bits and a sixth subset of the set of parity bits;

transmitting, at a sixth time following the fifth time, the sixth data packet from the telecommunications device for receipt by the receiver;

generating, at the telecommunications device and in the event a confirmation of incorrect receipt of the sixth data packet is communicated to the telecommunications device, using the rate matching algorithm to prioritize systematic bits of the set of systematic bits over parity bits of the set of parity bits, a seventh data packet of the data packets containing the first subset of the set of systematic bits and a seventh subset of the set of parity bits; and transmitting, at a seventh time following the sixth time.

16. The non-transitory computer-readable medium of claim 13, the process further comprising:

generating and transmitting, at the telecommunications device, the second data packet and the third data packet when the coding rate of the first data packet is in a range less than 1/2 and greater than 1/3; and generating and transmitting, at the telecommunications device, the fourth data packet and the fifth data packet when the coding rate of the first data packet is in a range greater than or equal to 1/2 and less than 5/6.

17. The non-transitory computer-readable medium of claim 13, the process further comprising transmitting from the telecommunications device for receipt by the receiver a two bit retransmission sequence number (RSN) value along with the first data packet and along with those of the second, third, fourth, and fifth data packets as are transmitted.

18. The non-transitory computer-readable medium of claim 17, wherein:

the RSN value is zero (0) for the first data packet;

the RSN value is one (1) for those of the second and fourth data packets as are transmitted; and the RSN value is two (2) for those of the third and fifth data packets as are transmitted; and in the event a confirmation of incorrect receipt of the third data packet or the fifth data packet is communicated to the telecommunications device, the method further comprising:

generating and transmitting to the receiver one or more additional retransmission data packets, an RSN value three (3) being transmitted to the receiver along with each data packet of the one or more additional retransmission data packets as are transmitted.

* * * * *